United States Patent Office

Re. 27,845
Reissued Dec. 18, 1973

27,845

PREPARATION OF WHITE OILS WITH ORGANO-ALUMINUM ACTIVATED IRON GROUP METAL CATALYSTS

John B. Gilbert and Robert Kartzmark, Sarnia, Ontario, Canada, assignors to Esso Research and Engineering Company No Drawing. Original No. 3,658,692, dated Apr. 25, 1972, Ser. No. 871,943, Oct. 28, 1969. Application for reissue Sept. 18, 1972, Ser. No. 290,063
Int. Cl. C10g *23/02*
U.S. Cl. 208—89 35 Claims

Matter enclosed in heavy brackets [ ] appears in the original patent but forms no part of this reissue specification; matter printed in italics indicates the additions made by reissue.

ABSTRACT OF THE DISCLOSURE

A process for upgrading and improving the color, odor and stability of petroleum oils to render the latter suitable for use in specialty applications. Raw distillates and semi-refined oils of suitable boiling range and viscosity are refined, or further refined, in a hydrogenation process, at suitable conditions, in the presence of a catalyst which comprises a support and a transition metal complexed with an organometallic compound, to yield colorless mineral oils, i.e., white oils. These highly refined oils are used in pharmaceuticals and cosmetics and similar compositions requiring oil components that meet certain high quality standards.

White oils are highly refined oils derived from petroleum which have been extensively treated to virtually eliminate oxygen, nitrogen, sulfur compounds and reactive hydrocarbons such as aromatic hydrocarbons. White oils fall into two classes, i.e., technical white oils which are used in cosmetics, textile lubrication, insecticide base oils, etc., and the even more highly refined pharmaceutical white oils which are used in drug compositions, foods and for the lubrication of food handling machinery. For all of these applications white oils must be chemically inert and without color, odor and taste.

The conventional method of making white oils involves refining petroleum oils with sulfuric acid. The acid removes impurities and reactive compounds by chemical reaction and by solvation. Acid treating is costly because it results in low product yields and produces large amounts of sludge and spent acid which must be disposed of, along with spent clay used for treatment of the product to remove traces of sulfonates and the like.

It is known to produce semi-refined oils by extraction methods, with subsequent hydrogenation of the raffinates, though the high quality standards required of white oils cannot be met by such techniques. It is thus known that selected oils can be extracted with solvents to obtain a raffinate low in aromatics, and that the raffinate can be subjected to hydrogenation in the presence of an active hydrodesulfurization catalyst to saturate or destroy heterocyclic compounds containing sulfur, nitrogen and oxygen to produce a semi-refined oil, or oil which approaches but does not meet white oil specifications. White oil specifications are rather difficult to meet, for such oils must have a color of +30 Saybolt, must pass the UV Absorption Test (ASTM D–2008) and the USP Hot Acid Test (ASTM D–565).

Nonetheless, it is a primary objective of the present invention to obviate these and other prior art difficulties and, in particular, to provide a new and improved process, or process combination, for manufacture of white oils which will eliminate any necessity of acid treating.

A further object is to provide a process for manufacturing highly stable white oils from raw distillates and semi-refined oils in good yield containing very insignificant concentrations, if any, of sulfur, nitrogen, oxygen and aromatics.

A specific object is to provide a process combination including a sequence of steps for manufacturing semi-refined oils, and subsequent treatment of such oils in the presence of highly active complex catalysts, at suitable conditions, for essentially complete saturation of the aromatics to produce white oils in good yield.

These and other objects are achieved in accordance with the present invention which provides a process comprising treating petroleum oils of suitable boiling range and viscosity, including raw distillates and semi-refined oils, and refining the latter to white oil specifications by hydrogenation with highly active supported transition metal complex catalysts, at hydrogenation conditions. The catalyst complex is formed by depositing a transition metal salt from solution on a suitable support material and activating the salt with a liquid-soluble organo-metallic compound.

Raw distillates and semi-refined oils of suitable boiling range and viscosity, provide feedstocks suitable for use in the preparation of white oils by contact with the highly active complex catalyst, at hydrogenation conditions. The feedstocks can be obtained by conventional processing comprising (a) solvent extracting a lubricating oil or raw distillate to obtain a raffinate; (b) treating the raffinate with hydrogen over an active hydrodesulfurization catalyst at conditions suitable to reduce the sulfur content, and then (c) distilling the hydrotreated product under vacuum to remove overhead a low boiling fraction, while recovering a higher boiling, semi-refined low sulfur oil fraction. Suitably, e.g., a petroleum oil, obtained by distillation, boiling in the range of 400° to 1,025° F. and having a viscosity of about 35 to 2,500 SSU at 100° F. can be extracted with a suitable solvent for aromatic hydrocarbons, e.g., phenol, furfural or $SO_3$ to produce a raffinate boiling in the range of about 400° to 1,025° F. The raffinate can be hydrogenated, if desired, or necessary, with a conventional hydrodesulfurization catalyst to produce a low sulfur oil containing, preferably, less than about 5 p.p.m. sulfur. This oil, or feedstock, can then be upgraded to specification white oil by a second hydrogenation in the presence of a highly active catalyst complex formed by a supported transition metal salt, activated with a liquid-soluble organo-metallic compound.

Suitable feedstocks for conversion to white oils over the highly active complex catalysts are those boiling within a range of from about 400° to 1,025° F., and higher, preferably from about 650° F. to 1,025° F. While higher boiling feedstocks can be used, this is not generally desirable inasmuch as process conditions must be increased in severity to an impractical extent. Viscosities range preferably from about 30 to about 2,500 SSU at 100° F., and more preferably from about 35 to 500 SSU at 100° F., but viscosity can be readily controlled, e.g., by topping. The aromatics content of the initially treated feed is not critical inasmuch as aromatics can be reduced to an acceptable level by extraction and prehydrogenation, but the aromatics content of the feedstock directly used for treatment and hydrogenation with the complex catalyst should preferably be no greater than about 5 percent, based on the weight of the feedstock, and is more preferably less.

Conventional solvent extraction processes can be used to reduce the aromatic hydrocarbon content of the oil. For example, a preferred extraction with phenol at a temperature in the range of 100° to 300° F. and a pressure in the range of about ambient to 100 p.s.i.g. provides a suitable means of aromatics removal. Suitably, from about 50 to 500 percent of the solvent, based on the weight of the oil, is employed in the extraction.

The raffinate is hydrogenated at relatively severe conditions to remove the heterocyclic compounds, and in particular to reduce the sulfur content of the oil, preferably to less than about 5 p.p.m. sulfur. Suitable hydrogenation conditions include temperatures in the range of about 400° to 800° F., and preferably in the range of about 600° to 700° F.; pressures in the range of about 1,000 to 10,000 and preferably in the range of about 500 to 5,000 p.s.i.g.; space velocities in the range of about 0.1 to 10 v./hr./v., preferably in the range of about 0.1 to 2 v./hr./v.; and hydrogen rates of from about 500 to 10,000 s.c.f./bbl. and preferably hydrogen rates of about 1,000 to 5,000 s.c.f./bbl. of feed. Suitable hydrotreating catalysts comprise one or more hydrogenation metals supported on a suitable carrier material. The metals are in the form of metal oxides or metal sulfides. Salts of Group VI and Group VIII metals are the preferred hydrogenating components. Specifically, oxides or sulfides of molybdenum, tungsten, cobalt, nickel and iron are used. Alumina, alumina containing 1 to 10 weight percent silica, bauxite, kieselguhr, etc., are preferred support materials. The most preferred catalysts are sulfided cobalt molybdate or sulfided nickel molybdate on alumina or silica alumina. The catalyst can be disposed for contacting in a fixed bed for liquid phase or mixed phase contacting. This first stage of hydrogenation performs several functions, including hydrodesulfurization, hydrodenitrogenation, saturation of olefins, some saturation of aromatic hydrocarbon rings, etc. The hydrorefined, or semi-refined, oils can be topped, if desired, to adjust viscosity and specific gravity in accordance with market requirements.

The feedstocks, or white oil base stocks, can be hydrogenated in the presence of the high activity complex catalysts to produce white oils. Pressures, space velocities and hydrogen rates are essentially the same as in the first hydrogenation stage wherein salts of Groups VIB and VIII hydrogenation metals are employed, though temperatures are generally lower. Preferably, the temperature employed in hydrogenation of the feedstocks with the highly active complex catalysts ranges from about 350° to 600° F., and more preferably from about 475° to 525° F. The highly active complex catalysts are prepared by the steps of impregnating a support with a solution of a liquid soluble compound of a transition metal, preferably a Group VIII metal of the Periodic Chart of the Elements; and then activating the supported metal species with a solution of an organo-metallic compound, a metallic constituent of which is selected from Groups I, II and III of the Periodic Chart of the Elements. The transition or Group VIII metal salt can be dissolved in an aqueous or nonaqueous medium to form the solution, depending on the specific nature and character of the salt. Preferably, a water-soluble form of salt is used, and in impregnation of the support, subsequent activation steps include: heat-treating the impregnated support sufficient to form a complex of a species of the metal at the surface of the support and to remove liquid and adsorbed oxygen; activating the supported metal complex by contacting same with a liquid soluble organometallic compound, a metallic constituent of which is selected from Groups I, II and III of the Periodic Chart of the Elements, and treating the activated supported metal complex to eliminate volatile matter.

A highly tenacious chemical bonding can be formed between the surface of certain types of supports and transition or Group VIII metals, particularly iron, cobalt and nickel, of the Periodic Chart of the Elements, when the latter are applied to the supports as solutions of the desired metal, and heat treated. The supported species, or product formed by the heat treatment, is further chemically altered and activated by treatment with liquid soluble organometallic compounds, wherein the metal constituent of the compound is selected from Groups I, II and III of the Periodic Chart of the Elements.

Various solvents are suitable for dissolving metal salts, including water which is particularly suitable for application of the transition or Group VIII metal salt to the support. In the sequence of process steps, in any event, a support is first impregnated with a solvent-soluble or water-soluble species of a transition or Group VIII metal salt, preferably iron, cobalt, and nickel, by contact or immersion of the support in an organic or aqueous solution of a salt of the desired metal. Suitably, the support is impregnated with from about 1 to about 20 percent metal, and preferably from about 2 to about 10 percent metal, based on the total weight of the deposited metal and support.

The use of water to effect the chemical bonding is particularly important in the impregnation of the supports with the water-soluble salts of the desired Group VIII metal. Even iron has produced an exceptionally active catalyst when applied to the support in the form of salts dissolved in aqueous solution. Exemplary of water-soluble salts useful for application of the desired metals are halides, e.g., ferric chloride, ferrous chloride, cobaltous chloride, nickel chloride, nickel bromide, nickel fluoride, sulfates, e.g., ferric sulfate, ferrous ammonium sulfate, nickel sulfate, cobaltous sulfate, nitrates, e.g., cobaltous nitrate, nickel nitrate, ferric nitrate, water-soluble carboxylic acid salts, e.g., cobaltous acetate, nickel acetate, ferric or ferrous acetates, formates, propionates, and water-soluble phosphates and the like. Exemplary of salts useful for application by solution in organic solvents, e.g., petroleum naphthas, alcohols, ethers, ketones and the like are the acetyl acetonates, carbonates, halides, chelates, and various heterocyclic compounds of iron, cobalt and nickel.

Where the support, in powder or granular form, is impregnated with an aqueous salt solution it is next treated by establishing time-temperature relationships suitable to produce a chemical change on the surface of the support and to remove water and adsorbed oxygen. Suitably, the impregnated support can be heated in air, in inert atmosphere or in vacuum, e.g., 20 to 29 inches of mercury, at from about 300° to about 1,200° F., or preferably from about 400° to about 800° F., for periods ranging from about 0.5 to about 4 hours, or preferably from about 1 to about 2 hours. On the other hand, the reaction between the salt and support can be accomplished by the elevated temperature while moisture is stripped from the support with nitrogen, or other nonreactive gas. If desirable, the impregnation and heat-treating steps can be conducted in multiple stages. For example, the support can be impregnated and thence dried, or partially dried, at low temperature. The support can thence be reimpregnated and again dried, or partially dried. The heat treatment per se can also be conducted in multiple stages, if desired. The impregnated support, to facilitate handling, can thus be subjected to a first rather mild heat treatment to dry the support and thence, in a second step, to a more severe treatment to produce the desired chemical change at the surface. In the formation of such catalysts, supported catalysts such as supplied by commercial catalyst manufacturers, e.g., iron, cobalt or nickel, alone or in combination with other metals such as molybdenum, tungsten or the like, are also amenable to such treatments to transform them into highly active catalysts.

Suitable supports are the oxides of Groups II, III, IV, V and VI–B of the Periodic Chart of the Elements, through the oxides of Groups II, III–A and IV–B are preferred. The Group III–A metal oxides, particularly boria and alumina, are especially preferred. Alumina supports, in fact, are quite outstanding from a cost-effectiveness standpoint and are readily available. Silica-free alumina has been found especially suitable though silica alumina combinations of types used for cracking catalysts are also highly active. Group II metal oxides, such as zinc oxide, magnesium oxide, calcium oxide, strontium oxide and barium oxide and also the Group IV metal oxides, e.g., titanium oxide and zirconium oxide, Group V metal oxides, e.g., vanadium oxide, and activated carbon and coke are effective. Certain natural clays, diatomaceous earths, e.g., kieselguhr, and other supports are also useful.

The impregnated support is activated by treatment with an organo-metallic compound, suitably a hydrocarbon solution of an organo-metallic compound, a metallic constituent of which is selected from Group I, II and III, or more preferably from Group I–A, II–B, and III–A of atomic number ranging from 3 to 30, of the Periodic Chart of the Elements. Suitably, compounds include those having the formula: $M(R_n)X$ wherein M is a Group I, II, or III, and preferably a Group I–A, II–B or III–A, metal having an atomic number of from 3 to 30; R is hydrogen or a monovalent organo or hydrocarbon radical, preferably ethyl, propyl, isopropyl, butyl, isobutyl, cyclopentyl, cyclohexyl, phenyl, naphthyl, and benzyl; X is selected from the group consisting of halogen, $R_1$ where $R_1$ is a hydrocarbon radical as previously described for R, and $OR_1$; and *n* is an integer ranging from 1 to 2. The R (and $R_1$) groups can be the same or different, substituted or unsubstituted, saturated or unsaturated, and can be alkyl, aryl, alkaryl, aralkyl, or cycloalkyl. Such groups include, for example, methyl, ethyl, n-propyl, isopropyl, isobutyl, sec-butyl, tert-butyl, n-amyl, isoamyl, heptyl, n-octyl, n-dodecyl, and the like; 2-butenyl, 2-methyl-2-butenyl and the like; cyclopentyl-methyl, cyclohexylethyl, cyclohexylpropyl and the like; 2-phenyethyl, 2-phenylpropyl, 2-naphthylethyl, methyl naphthylethyl and the like; cyclopentyl, cycohexyl, 2,2,1-bicycloheptyl and the like; methylcyclohexyl, dimethylcyclohexyl, 5-cyclopentadienyl, and the like; phenylcyclopentyl, and the like; phenyl, tolyl, xylyl, ethylphenyl, xenyl, naphthyl, cyclohexyphenyl and the like. In general, an R group can contain up to about 20 carbon atoms. M is selected from such metals as lithium, magnesium, calcium, strontium, zinc, cadmium, boron and aluminum.

Preferred activating agents are the $AlR_3$ or tri-alkyl substituted products of aluminum, particularly those containing alkyl groups having from one to about 12 carbon atoms, and more particularly those containing from one to about four carbon atoms, especially linear alkyl groups. Exemplary of such compounds, which contain up to about 36 carbon atoms in the molecule, are trimethyl aluminum, triethyl aluminum, tri-n-butyl aluminum, tri-n-hexyl aluminum, tridodecyl aluminum and the like.

The activation can be carried out with pure or diluted metal alkyl compounds in liquid or in the vapor phase. Hydrocarbon diluents of the paraffinic, cycloparaffinic or aromatic types are entirely suitable and the metal alkyl compound may be present in concentrations of 5 percent to 50 percent in the diluent. A solution of about 20 percent aluminum triethyl in a paraffinic diluent is a preferred activation system. The activation reaction is quite exothermic and it may be desirable to remove the heat of activation. The temperature during the activation step is maintained in the range of from about −60° to about 500° F., preferably from about 100° to about 200° F. The molar ratio of complexing agent (in terms of, e.g., the aluminum to the transition or Group VIII metal) ranges from about 1:1 to about 15:1. Considerable gas liberation occurs during activation and these gases are normally vented from the system. The activation is allowed to proceed until reaction is no longer observed, generally 0.5 hour to 2 hours in contact with at least some excess of metal alkyl compound.

After the activation step, the excess liquid can be drained from the catalyst, if desired. In any event, it is necessary to remove the unreacted organo-metallic activating agent, unbound byproducts and volatiles from the catalyst. This can be done by any suitable method such as by washing, drying or the like, but preferably the activated catalyst is subjected to heat-treatment at temperatures sufficient to thoroughly dry and condition the catalyst. A heat treatment is necessary for activation. Preferably, the heat treatment is conducted in a non-reactive or hydrogen atmosphere at temperatures ranging from about 250° to about 800° F., and more preferably from about 200° to about 500° F., for periods ranging up to 24 hours, and preferably from about 0.5 to about 4 hours, or more preferably from about 1 to about 2 hours. Complete or partial vacuum may also be used to aid in removal of excess solvent and organo-metallic alkyl compounds.

The exact nature of the complex formed in the activation step is not known, but it is believed that this step produces a metal-to-metal bond between the metal species of the salt and the metal species of which the support is formed. For example, in activation of a nickel salt impregnated upon an alumina support it is believed that the nickel becomes bonded to active sites on the support, probably to aluminum. The transition or Group VIII metal species, therefore, becomes highly dispersed in atomic form rather than in bulk crystallite form as in conventional catalysts, producing a highly active and stable hydrogenation catalyst.

The following examples demonstrate the more salient features and provide a better understanding of the invention. In the examples immediately following, a commercial type nickel catalyst is employed in hydrogenation of the feedstock, or white oil base stock, because of its known high activity and these results are compared pari passu with the process of this invention under similar conditions, with a similar catalyst except that the catalyst is activated with a preferred species of organometallic.

The examples immediately following first illustrate a method of preparing complexed transition or Group VIII metal catalysts.

EXAMPLE 1

Approximately 39 g. of nickel acetylacetonate is dissolved in 350 cc. of hot toluene. 75 g. of 12–20 mesh activated alumina is added to the solution. The solvent is evaporated by heating. 86.5 cc. of triisobutyl aluminum in 260 cc. of n-heptane is added to the nickel impregnated support. The aluminum-to-nickel atomic ratio is 2.5:1. The nickel complex is heated in a hydrogen stream at 600° F. to remove the solvent and yield a catalyst containing about 10 weight percent nickel.

EXAMPLE 2

A conventional nickel catalyst is prepared by reducing a commercial nickel catalyst containing 44 percent as the hydrate, distended on kieselguhr. Reduction is accomplished by heating 100 cc. of the catalyst in a stream of hydrogen at 600° F., 800 p.s.i.g. and 2.0 s.c.f./hr. for 20 hours.

The catalysts of Examples 1 and 2 are tested comparatively in the same reactor. The feedstocks, or white oil base stocks, are nonsolvent extracted naphthenic lubricating oil distillates previously hydrodesulfurized at 700° F. and 1500 p.s.i.g. in the presence of cobalt molybdate catalyst to reduce the sulfur content of the oil to less than 2 parts per million. The conditions for the hydrofinishing treatment are 500° F., 2000 p.s.i.g., 0.25 v./hr./v. and 3,000 s.c.f./bbl. hydrogen.

Four tests, quite rigorous in their nature, are used to assess the extent of hydrogenation of the white oil feedstock. These are:

(a) Saybolt color;
(b) percent of aromatics, as determined by liquid chromatography on silica gel adsorbent;
(c) UV absorption coefficient of the oil at 270–278 mμ expressed as $$\left(\frac{\text{Log Io/I}}{\text{concentration} \times \text{path length}}\right),$$

see Haenne et al., Journal of the O.A.O.C., vol. 43, No. 1, pp. 92–95 (1960), on UV absorption as measured by ASTM D–2008 and ASTM D–2269; and (d) the test for carbonizable substances, ASTM D-565, also known as the Hot Acid Test.

The test results are shown in Table I which describe the successful preparation of technical grade white oils when using the process of this invention.

Table I thus shows the results obtained with the two catalysts for a low velocity feedstock (Feed A, having a viscosity at 100° F. of 75 SSU). The rather insensitive test with silica gel chromatography shows that the products from hydrogenation with both catalysts contains esucts from hydrgenation with both catalysts contains essentially no aromatics. The more sensitive UV absorption and Hot Acid Tests, which are necessary to reveal the very low aromatics content to determine whether or not the products can meet the rigid high quality standards required of white oils, however, show that the nickel complex provides a product which contains considerably smaller traces of aromatics than the product obtained when using the conventional reduced nickel catalyst. The difference is profound, and quite significant for products intended for use as white oils.

TABLE I

| | Feed A | Catalyst: Nickel complex | Catalyst: Commercial reduced nickel |
|---|---|---|---|
| Temperature, ° F | | 500 | 500 |
| Pressure, p.s.i.g | | 2,000 | 2,000 |
| Space velocity, LHSV | | 0.25 | 0.25 |
| $H_2$ throughput, s.c.f./bbl | | 3,000 | 3,000 |
| Inspections: | | | |
| Viscosity at 100° F., SSU | 74.8 | 73.8 | 74.2 |
| Color, Saybolt | *18¼ TR | +33 | +33 |
| Aromatics, weight percent | 10.7 | Nil | Nil |
| UV absorption 270-278 mμ l./g. cm | 0.290 | 0.0014 | 0.011 |
| Carbonizable substances, ASTM D-565, Color No | Black | 7 | >20 |

*Tag Robinson.

The same comparative test is carried out on a semirefined high viscosity naphthenic lubricating oil feed (Feed B) having a viscosity at 100° F. of 478 SSU. The test results are shown in Table II.

All four tests demonstrate, as shown by reference to Table II, the superiority of the nickel complex catalyst in providing high purity technical grade white oils. Thus the process of the invention provides an effective means for producing specification grade white oils.

The following example further demonstrates that even products meeting specifications for pharmaceutical-grade white oils can be made pursuant to the practice of this invention.

EXAMPLE 3

In Table III, data are again given comparing the process of this invention using a complex nickel catalyst vis-a-vis a commercially available nickel catalyst. The example also shows a preferred processing sequence of steps involving solvent extraction to produce a higher grade of semirefined feed.

A Tia Juana heavy grade distillate (850°-1,050° F.; 60.6-71.9 percent yield on crude) is prepared, and phenol-extracted to produce a raffinate in 40-45 percent yield, based on the weight of the distillate. The raffinate is hydrodesulfurized over a 5/25 cobalt molybdate catalyst at 1,500 p.s.i.g., 700° F. and 0.25 v./v./hr. and then topped to 800° F., at 80 percent yield, to provide a semirefined oil.

TABLE II

| | Feed B | Catalyst: Nickel complex | | Catalyst: Commercial reduced nickel | |
|---|---|---|---|---|---|
| Temperature, ° F | | 500 | | 500 | |
| Pressure, p.s.i.g | | 2,000 | | 2,000 | |
| Space velocity, LHSV | | 0.25 | | 0.25 | |
| $H_2$ Throughput, s.c.f./bbl | | 3,000 | | 3,000 | |
| No. Passes | | 1 | 2 | 1 | 2 |
| Inspections: | | | | | |
| Viscosity at 100° F., SSU | 478 | 450 | 439 | 462 | 453 |
| Color, Saybolt | *16½ TR | +29 | +35 | +24 | +28 |
| Aromatics, weight percent | 28.9 | 1.6 | Nil | 11.4 | 5.3 |
| UV Absorption 270-278 mμ, l./g. cm | 1.045 | 0.014 | 0.0087 | 0.502 | 0.084 |
| Carbonizable substances, ASTM D-565, Color No | Black | Brown | 20 | Black | Black |

*Tag Robinson.

The semirefined oil is then hydrogenated at 2,000 p.s.i.g., 500° F., 0.25 v./v./hr., and 2,000 s.c.f./bbl. first over the commercial catalyst as defined in Example 2, and then over the alkyl activated catalyst defined in Example 1. The results are tabulated in Table III.

TABLE III

Hydrogenation conditions: 2,000 p.s.i.g., 500° F., 0.25 v./v./hr., 2,000 s.c.f./bbl.

| | Commercial reduced nickel catalyst | Complex nickel catalyst | Requirements |
|---|---|---|---|
| U.S.P. hot acid | 3-4 | 1 | Spec.: 3 max. |
| ASTM D-565, U.V. absorbance ASTM D-2008 275 mμ. | 0.172 | 0.041 | Spec.: 0.3 max. |
| 295-9 mμ | 0.230 | 0.066 | Spec.: 0.225 max. |
| 300-400 mμ | 0.220 | 0.066 | Spec.: 0.18 max. |
| DMSO-UV absorbance ASTM D-2269 260-350 mμ. | 0.03 | 0.040 | Spec.: 0.10 max. |
| Odor and taste | (1) | Pass | |

[1] Did not pass.

Overall yield, based on the initial distillate, is 31 percent. It is thus seen by comparison of the above data that the process utilizing the catalyst of this invention readily produces finished pharmaceutical grade white oil, in good yield, whereas the process employing the commercial nickel catalyst cannot, even though the same optimum operating conditions are employed.

EXAMPLES 4-6

(A) Tia Juana light grade oil, 675°-800° F. distillate, 45.1-52.4 percent, based on the weight of crude, is phenol-extracted and subjected to hydrodesulfurization as in the foregoing example, and then topped to 600° F., at 95 percent yield. This feedstock, or white oil base stock, is then hydrogenated with aluminum alkyl reduced metal catalysts at 2,000 p.s.i.g., 500° F. and 0.36 LHSV prepared as follows:

(A) One hundred grams of aqueous solution is prepared by dissolving 34 grams $FeCl_3 \cdot 6H_2O$ in 66 grams of water. One hundred grams F-1 alumina (8-14 mesh) is added to the solution and allowed to stand with occasional mixing for about 30 minutes. A small quantity of liquid is poured off and the catalyst freed of excess liquid by placing on absorbent paper towels. The catalyst is dried for 3 hours in a vacuum oven at 475°-550° F. The recovered catalyst weighs 107.4 grams, and analyzes 5.3 percent iron (calculated as Fe).

A heated quartz reaction tube is charged with 25.7 grams of the above catalyst and a preheat area above the catalyst bed is filled with stainless steel distillation packing. The catalyst is heated in a stream of dry nitrogen at a temperature of 500°–550° F. for one hour and is then cooled in nitrogen to room temperature. The reactor is flooded from the bottom with a 20 percent solution of aluminum triethyl. Considerable gas is evolved and the maximum temperature reached is 200° F. After 1.33 hours, the solution is withdrawn. A rapid flow of nitrogen is introduced and the temperature is increased to 350° F. Stripping is continued for about 30 minutes.

(B) A commercial cobalt molybdena-on-alumina catalyst (Nalco 471A) containing about 3.5 percent CoO and 12 percent $MoO_3$ and in the form of 1/16-inch extruded rods calcined at 1,200° F. for 12 hours and then charged (36.7 grams) to the quartz reaction tube is heated in a flow of dry nitrogen. After cooling in dry nitrogen, the catalyst bed is flooded with 20 percent aluminum triethyl. Maximum temperature reached is 160° F. After 40 minutes, the solution is withdrawn and the catalyst brought to 600° F. in a stream of dry hydrogen. Substantially all volatile material is removed in 15 minutes at 500° F.

(C) One hundred grams of F–1 alumina is slurried with 200 ml. water with mechanical agitation. Over a period of 5 minutes, 20 ml. platinum chloride HCl solution (0.56 gm. Pt) is added and agitation continued for 30 minutes. Liquid is decanted off and the catalyst is dried in a vacuum oven at 170° F. The catalyst analyzes 0.13 weight percent platinum.

The quartz tube is charged with 48.2 gms. of the above catalyst and the catalyst is heated in a stream of dry nitrogen at 600° F. for 1 hour. After cooling to room temperature, the catalyst is treated with 20 percent $AlEt_3$ (heptane) solution for a period of 90 minutes during which the maximum temperature noted is 215° F.

After draining off the liquid, the catalyst is treated in a flow of dry hydrogen at 400° F. for 1 hour.

In each instance it is found that a suitable technical grade white oil is prepared.

What is claimed is:

1. A process for producing a white oil comprising contacting a low sulfur content white oil base stock boiling within a range of from about 400° to about 1025° F. and having a viscosity ranging from about 35 to about 2500 SSU at 100° F. at hydrogenation conditions with hydrogen and a catalyst comprising a complex of a metal selected from the group consisting of iron, cobalt and nickel composited with a support selected from the group consisting of alumina, silica-alumina and boria, said catalyst having been prepared by reacting a composite of a salt of the said metal and said support with an aluminum compound having the general formula $AlR_3$ in which R is an alkyl, aryl, alkaryl, aralkyl, or cycloalkyl radical and *then* heating *the reacted composite* in a non-reactive *or hydrogen* atmosphere to activate [the] said catalyst.

2. The process of claim 1 wherein the sulfur content of the white oil base stock is less than about 5 p.p.m.

3. The process of claim 1 wherein the boiling range of the white oil base stock ranges from about 650° to about 1025° F.

4. The process of claim 1 wherein the catalyst composite comprises [of] nickel on alumina.

5. The process of claim 1 wherein the viscosity of the white oil base stock ranges from about 35 to 500 SSU at 100° F.

6. A process for producing white oil from a petroleum lubricating oil fraction containing contaminants including aromatic hydrocarbons, sulfur compound *and* nitrogen compounds comprising the steps of:

(a) contacting said fraction at a temperature in the range of about 400° to 800° F. and a pressure in the range of about 500 to 5000 p.s.i.g. with hydrogen and a first catalyst comprising a support material and a hydrogenation component selected from the group consisting of Group VI–B metals, Group VIII metals and mixtures thereof;

(b) recovering a semi-refined fraction having a substantially reduced quantity of said contaminants; and (c) contacting said semi-refined fraction at relatively mild hydrogenation conditions with hydrogen and a second catalyst comprising complexed metal on alumina, said metal being selected from the group consisting of iron, cobalt and nickel, and said second catalyst having been complexed by reacting said metal on alumina with an aluminum compound having the general formula $AlR_3$ in which R is an alkyl, aryl, alkaryl, aralkyl or cycloalkyl radical.

7. The process of claim 6 wherein the said second catalyst comprises complexed nickel on alumina, said catalyst having been prepared by reacting a nickel on alumina composite with the said aluminum compound.

8. A process for producing a white oil consisting essentially of the steps of:

(a) extracting a naphthenic lubricating oil fraction with a solvent to remove aromatics;

(b) recovering a raffinate fraction comprising a 30 to 75 volume percent of said lubricating oil fraction;

(c) contacting said raffinate with hydrogen at a temperature in the range of 600° to 800° F. and a pressure in the range of 1000 to 10,000 p.s.i.g. in the presence of a catalyst comprising a support material and a hydrogenation component selected from the group consisting of Group VI–B metals, Group VIII metals and mixtures thereof;

(d) recovering a semi-refined white oil;

(e) distilling the semi-refined white oil to obtain a topped fraction having a viscosity in the range of 30 to 2500 SSU at 100° F.;

(f) contacting said topped fraction with hydrogen at a temperature in the range of 475° to 525° F. and a pressure in the range of 1000 to 10,000 p.s.i.g., and with a catalyst composite comprising a supported complex metal catalyst, said catalyst having been prepared by impregnating a support selected from the group consisting of alumina, silica-alumina and boria, with a salt of a metal selected from the group consisting of iron, cobalt and nickel, heating said impregnated support [to form said support complex metal catalyst], *thereafter* reacting said [supported catalyst] *impregnated support* with an aluminum compound having the general formula $AlR_3$ in which R is an alkyl, aryl, alkaryl, aralkyl or cycloalkyl radical, and *then* heating *the reacted catalyst* in a non-reactive *or hydrogen* atmosphere to activate [the] said catalyst; and (g) recovering a white oil which passes the Hot Acid Test.

9. The process of claim 8 wherein the solvent is phenol.

10. The process of claim 8 wherein the catalyst contacted by the raffinate in step (c) comprises a sulfided cobalt molybdate on alumina.

11. The process of claim 8 wherein the supported complex metal catalyst is nickel on alumina.

12. The process of claim 8 wherein the topped semi-refined white oil is one having a viscosity ranging from about 30 to about 500 SSU at 100° F.

13. A process for processing white oil comprising forming a white oil base stock by [at]

extracting an oil boiling in a range of from about 400 to about 1025° F., and having a viscosity of about 35 to about 2500 SSU at 100° F. with a solvent to produce a raffinate of reduced aromatic content, said raffinate boiling within the range of from about 400° to about 1025° F., hydrodesulfurizing the raffinate by contact with a hydrogenation catalyst comprising a support material and a hydrogenation component selected from the group consisting of Group VI–B metals, Group VIII metals and mixtures thereof, at a temperature ranging from about 400° to 800° F., a pressure ranging from about 1000 to 10,000 p.s.i.g., space velocities ranging from about 0.1 to 10 v./hr./v., and at hydrogen rates of from about 500 to 10,000 s.c.f./bbl., contacting said desulfurized oil at hydrogenation conditions with hydrogen and a catalyst composite comprising *a* support selected from the group consisting of alumina, silica-alumina and boria, and a metal selected from the group consisting of iron, cobalt and nickel, said catalyst composite having been prepared by reacting the said composite with an aluminum compound having the general formula $AlR_3$ in which R is an alkyl, aryl, alkaryl, aralkyl or cycloalkyl radical, and recovering a colorless white oil containing essentially no aromatic compounds.

*14. The process of claim 1 wherein said catalyst, after reaction with said aluminum compound, is heated in a hydrogen atmosphere to activate said catalyst.*

*15. The process of claim 1 wherein said aluminum compound is a trialkyl substituted aluminum.*

*16. The process of claim 1 wherein said catalyst, after reaction with said aluminum compound, is heated in a hydrogen atmosphere at a temperature varying from 250° to 800° F. to activate said catalyst.*

*17. The process of claim 4 wherein said catalyst composite is reacted with triethyl aluminum and thereafter heated in a hydrogen atmosphere at a temperature in the range of from about 250° to 800° F.*

*18. The process of claim 6 wherein said second catalyst, after having been complexed by reaction with said aluminum compound, is heated in a hydrogen atmosphere to activate said catalyst.*

*19. The process of claim 6 wherein R is an alkyl radical having from 1 to 12 carbon atoms.*

*20. The process of claim 19 wherein said second catalyst, after complexing by reaction with said aluminum compound, is heated in a hydrogen atmosphere at a temperature varying from about 250° to 800° F.*

*21. The process of claim 7 wherein R is an alkyl radical having from 1 to 12 carbon atoms.*

*22. The process of claim 7 wherein said aluminum compound is triethyl aluminum and said second catalyst, after complexing by reaction with said aluminum compound, is heated in a hydrogen atmosphere at a temperature varying from 250° to 800° F.*

*23. The process of claim 8 wherein said supported catalyst, after reaction with said aluminum compound, is heated in a hydrogen atmosphere to activate said catalyst.*

*24. The process of claim 8 wherein R is an alkyl radical having from 1 to 12 carbon atoms.*

*25. The process of claim 24 wherein said supported complex metal catalyst, after reaction with said aluminum compound, is heated in a hydrogen atmosphere at a temperature varying from about 250° to 800° F.*

*26. The process of claim 11 wherein said impregnated support is reacted with triethyl aluminum and thereafter the reacted catalyst is heated in a hydrogen atmosphere at a temperature varying from 250° to 800° F.*

*27. The process of claim 13 wherein the catalyst composite, after reaction with said aluminum compound, is heated in a hydrogen atmosphere to activate said catalyst.*

*28. The process of claim 13 wherein R is an alkyl radical having from 1 to 12 carbon atoms.*

*29. The process of claim 28 wherein said catalyst composite, after reaction with said aluminum compound, is heated in a hydrogen atmosphere at a temperature varying from 250° to 800° F. to activate said catalyst.*

*30. The process of claim 6 wherein said first catalyst comprises a sulfided nickel molybdate on alumina.*

*31. The process of claim 7 wherein said first catalyst comprises a sulfided nickel molybdate on alumina.*

*32. The process of claim 8 wherein the catalyst contacted with said raffinate in step (c) comprises a sulfided nickel molybdate on alumina.*

*33. The process of claim 11 wherein the catalyst contacted with said raffinate in step (c) comprises a sulfided nickel molybdate on alumina.*

*34. The process of claim 13 wherein the catalyst employed in the hydrodesulfurization of the raffinate comprises a sulfided nickel molybdate on alumina.*

*35. The process of claim 29 wherein the catalyst employed in the hydrodesulfurization of the raffinate comprises a sulfided nickel molybdate on alumina.*

References Cited

The following references, cited by the Examiner, are of record in the patented file of this patent or the original patent.

UNITED STATES PATENTS

| | | | |
|---|---|---|---|
| 2,756,183 | 7/1956 | Knox, Jr. | 208—217 |
| 2,946,743 | 7/1960 | Moy et al. | 208—217 |
| 3,340,181 | 9/1967 | Diringer et al. | 208—211 |
| 3,392,112 | 7/1968 | Bercik et al. | 208—143 |
| 3,412,174 | 10/1968 | Kroll | 208—143 |
| 3,414,506 | 12/1968 | Van Lookeren Campagne | 208—264 |
| 3,705,093 | 12/1972 | Ashcraft, Jr. | 208—89 |
| 3,723,296 | 3/1973 | Hahn | 208—89 |
| 3,728,250 | 4/1973 | Hass et al. | 208—89 |

DELBERT E. GANTZ, Primary Examiner

G. J. CRASANAKIS, Assistant Examiner

U.S. Cl. X.R.

208—210